United States Patent Office 3,517,911
Patented June 30, 1970

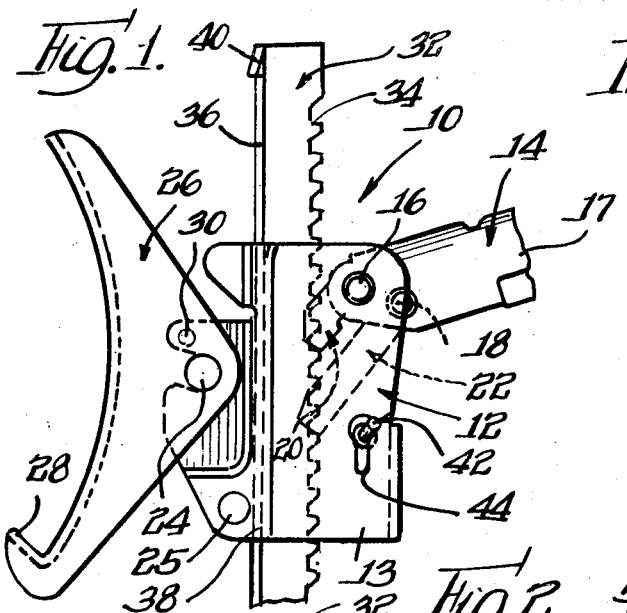
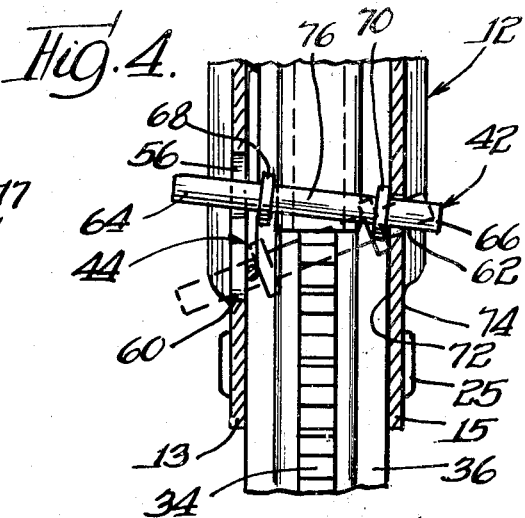
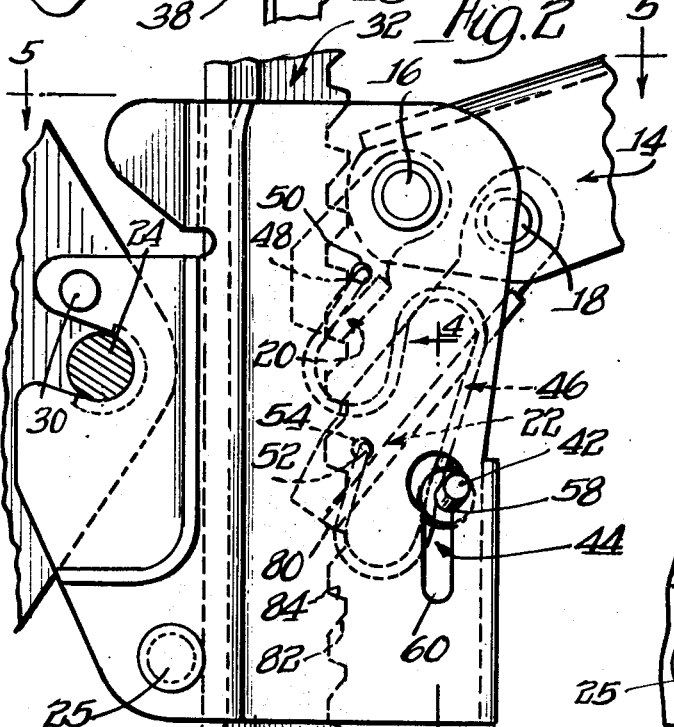
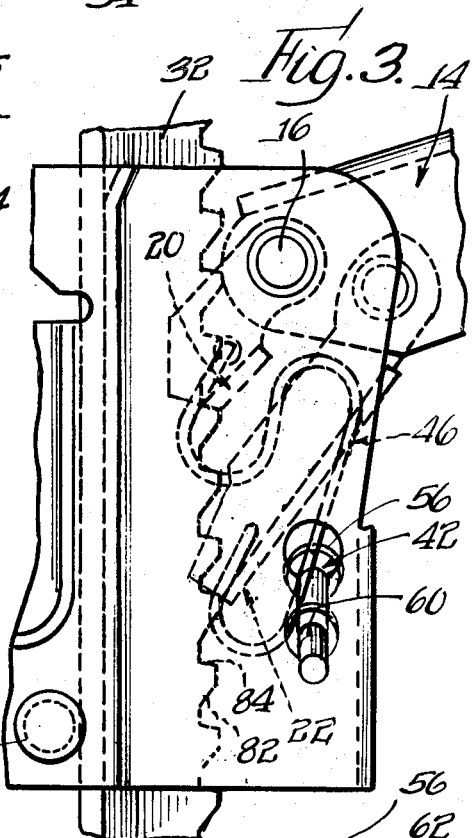
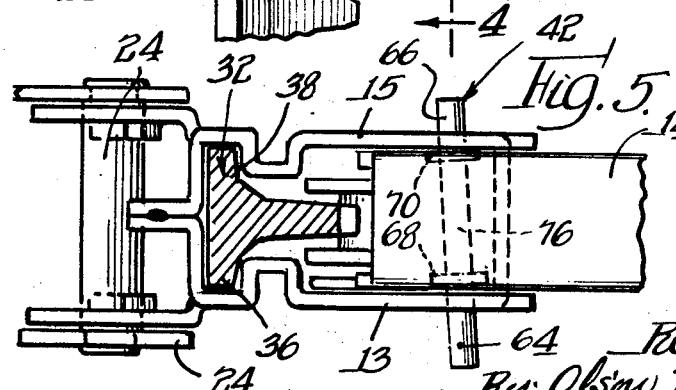
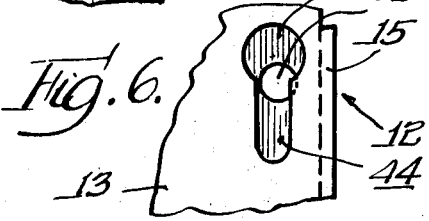

3,517,911
CAR JACK
Ronald Lynn Grams, St. Joseph, Mich., assignor to Auto Specialties Manufacturing Company, St. Joseph, Mich., a corporation of Michigan
Filed Nov. 13, 1967, Ser. No. 682,090
Int. Cl. B66f 1/06
U.S. Cl. 254—111                                                10 Claims

ABSTRACT OF THE DISCLOSURE

A direction setting mechanism for use in an automobile jack assembly or the like, comprising a rod-like pin element having a pair of flange portions each being located a predetermined distance from a respective end of the pin element. Each end of the pin element is received in a respective aperture, one being in the shape of a keyhole in the walls of the jack assembly body member and the pin element is held between the walls by the flange portions. The center section of the pin element engages a pawl spring within the body member and depending upon the movement of the end of the pin element in the keyhole shaped aperture, the spring is compressed thereby or relaxed, to change the direction of the body member which controls the movement of an automobile being held thereby.

BACKGROUND OF THE INVENTION

This invention relates in general to equipment for use with an automobile and more particularly to an automobile jack assembly.

With every new automobile that is sold, an automobile jack assembly is furnished as part of the standard equipment. The type of jack provided usually is one comprising a body member having a handle socket pivotally connected thereto for receiving a jack handle therein to be used in raising and lowering the automobile. The body member, which also includes a member for gripping the bumper of the automobile to be raised, contains therein pawl members which engage a set of teeth located on a vertical support member, upon which the body member rides when being raised or lowered. A curved pawl spring also within the body member is moved to cause the engagement and locking of the pawl members on the set of teeth, to determine the direction in which the automobile being held by the jack assembly will be moved. In jack assemblies being manufactured presently, the engagement of the spring with the pawl members is determined by a small lever which is pivotally attached to one of the outside walls of the body member, with a portion thereof extending within the body member at substantially right angles to said wall so as to engage the pawl spring therein. This small lever is ordinarily constructed of a stamped piece of sheet metal which is riveted to the body member of the jack assembly. The portion of the lever which is manually moved extends partially along the body member in parallel relation therewith, and is bent outwardly at an angle therefrom toward the free end of the lever.

The above-mentioned small stamped lever which is essential to the operation of the jack has certain drawbacks associated therewith. For one, because the lever is riveted to the body member, friction between the two, upon moving the lever, sometimes causes the operation of the lever to be difficult. Also, due to the inherent irregularity of pressure applied in the riveting process, the friction of the lever against the body member varies with each jack assembly furnished; thus some are more difficult to operate than others. Often, too, paint applied to the jack body member after the lever is assembled dries between the body member and lever and causes additional friction, and thus even more effort is required to operate the lever. Furthermore, an additional tab member is required within the body member to act as a stop to prevent one of the two pawl members therein, which the lever itself does not contact, from falling too far out of position when the jack is being lowered.

SUMMARY OF THE INVENTION

Accordingly, it is a general object of this invention to provide new and improved apparatus for use in an automobile jack assembly to change the direction of movement of an automobile being raised thereby.

It is a more specific object of this invention to provide new and improved direction setting apparatus for use with a jack assembly of the above-described type which overcomes the disadvantages discussed.

It is a further object of this invention to provide a direction setting member for use in a jack assembly which is easy to operate and which also serves to prevent a pawl member of the assembly from falling too far out of position when the body member thereof is being lowered.

It is yet another object of the invention to provide a direction setting member which provides a reduction in material and labor cost over previously used types of lever members, and which is more reliable and more easily assembled to the body member of the jack assembly than the last-mentioned lever members.

Briefly, the direction setting mechanism for use in the body member of an automobile jack assembly according to the invention comprises an elongated rod-like pin element having a pair of flange portions each being located a predetermined distance from a respective end of the pin. By means of the flange portions, the pin is held between the walls of the jack assembly body member. Each end of the pin extends through a respective aperture in one of the walls of the body member, outwardly therefrom, one of the apertures being elongated so that the corresponding end of the pin is movable in an upward or downward direction therein. The other end of the pin is pivotally movable in the respective aperture in the corresponding sidewall of the body member. The pin is moved upward at one end thereof to compress the pawl spring, thereby causing the jack to be raised in an upward direction, and the pin is moved downward to relax the pawl spring, thereby causing the jack to be lowered. In the lowered position the pin also serves as a stop to a lower pawl member within the body member, to prevent the pawl member from falling out of a working position.

A better understanding of the present invention and its organization and construction may be had by referring to the following description in conjunction with the accompanying drawings, of which:

FIG. 1 is a side view of a typical jack assembly using the direction setting mechanism according to the invention;

FIG. 2 is an enlarged view of a portion of the jack assembly of FIG. 1, illustrating the structural relation between the operating portion of the jack assembly and the direction setting mechanism in its upward position according to the invention;

FIG. 3 is an enlarged view of a portion of the jack assembly of FIG. 1, illustrating the structural relation between the operable parts of the jack assembly and the direction setting mechanism in its downward position, according to the invention;

FIG. 4 is a cross-sectional view of the jack assembly of FIG. 2, taken along the line 4—4 thereof;

FIG. 5 is a cross-sectional view of the jack assembly of FIG. 2, taken along the line 5—5 thereof; and FIG. 6 is a side sectioned view of the apertures in the walls of the body member of the jack assembly into which the direction setting mechanism of the invention is received.

DETAILED DESCRIPTION

Referring now to the drawings in more detail, FIG. 1 illustrates an automobile jack assembly 10 comprising a body member 12 including a pair of sidewalls 13 and 15, respectively. A rod member 25 aids in holding the walls together but at a fixed distance from one another. A handle socket 14 is pivotally mounted by means of a rod 16 to the sidewalls 13 and 15. Also connected to handle socket 14 by means of rod 16 and a second rod 18 are a lowering pawl 20 and lifting pawl 22, respectively, both of which are shown in dotted lines in FIG. 1 of the drawings, as being located between walls 13 and 15. A gripping member 26 which is provided for attachment thereof, by means of hook member 28, to an automobile bumper (not shown) is pivotally mounted on body member 12 by means of a rod 24 and pin 30. A vertical support member 32 having on one edge thereof a set of teeth 34 and on the other edge thereof a rail portion 36, is provided for the mounting thereon of body member 12. As can be seen in FIG. 1, the pawl members 20 and 22 engage teeth 34 and a U-shaped track 38, best seen in FIG. 5 of the drawings, formed by the wall members 13 and 15 of body member 12, slidably engages the rail portion 36 of vertical support 32. Handle socket 14, mentioned above, is constructed so as to be able to receive in aperture 17 thereof a jack handle (not shown). Upon operating the jack handle in a downward and upward motion the body member, by means of pawls 20 and 22, is able to move upward or downward along support member 32. At the extreme top end of support member 32 along the rail 36 there is located a stop portion 40 which serves to prevent the body member 12 from being raised along support member 32 beyond that point. Shown in the lower right hand corner of body member 12 in FIG. 1 of the drawings in the key-hole shaped slot 44 therein is a direction setting mechanism or rod-like pin element 42 according to the invention. The direction setting mechanism which will be explained in more detail below is used to change the direction of movement; i.e., in an upward direction or in a downward direction, of the body member 12 and its associated bumper-gripping member 26 along the vertical support member 32.

FIG. 2 of the drawings shows a portion of the jack assembly 10 of FIG. 1 in an enlarged view so that the operation of direction-setting pin element 42 thereof in relation to the operable components of the jack assembly, such as pawl members 20 and 22, etc., can more clearly be seen. In FIG. 2, a curved pawl spring 46 is shown, attached at one end 48 thereof to pawl member 20 through aperture 50 therethrough, and at the other end 52 thereof to the second pawl member 22, through aperture 54 therethrough. In operation, it is the compression or the lack of compression of spring member 46 to provide tension against the pawl member 22 which determines the direction in which the body memer 12 will be moved along support member 32. The application of tension by spring 46 is determined in the jack assembly according to the invention by means of pin element 42 which when positioned in the top circular portion 56 of key-hole-slot 44 will, as the jack handle is operated, cause the body member 12 to be moved upward along support member 32 raising an automobile attached thereto, and when in a position at the lower, narrower end 60 of the slot 44 will cause the pawl spring to be tensioned so that the body member will move downward along the support member 32, lowering an automobile attached thereto. As can be seen in FIG. 2, which shows the direction setting pin element 42 in position in the upper end 56 of slot 58, the spring member is compressed by the pin element to force the pawl spring 46 to be moved toward support member 32, and in turn forcing lifting pawl member 22 to positively engage the teeth 34. When the pin element 42 is in the upper portion 56 of aperture 44, it is retained therein through the tension of the pawl spring 46 exerted against the pin element. Because portion 56 of aperture 44 is larger than portion 60 thereof, pin element 42 can be moved to the periphery of portion 56 and be held from falling downward therefrom by the protruding edge 58 of the slot.

FIG. 3 of the drawings shows the direction setting pin element 42 positioned in the lower portion 60 of aperture or slot 44. As will be noted, the compression of the pawl spring 46 caused by pin element 42 has been removed and the spring is in an uncompressed state. Pawl 22 is free from positive engagement with teeth 34, but pawl 20 through the normal pressure applied by spring 46 in its uncompressed state, remains in engagement with the teeth so that body member 12 is lowered upon the operation of the jack handle.

Referring now to FIG. 4 of the drawings which, as mentioned above, is a sectional view of FIG. 2 taken along the line 4—4 thereof, rod-like direction setting pin element 42 is shown in solid lines in an upward set position in portion 56 of slot 44 and in dotted lines in a lower set position in portion 60 of slot 44. As can be seen clearly in FIG. 4, one end 64 of pin element 42 is received in aperture 44 of wall 13 and the other end 66 of pin element 42 is received in aperture 62 in wall 15 of body member 12. To prevent the pin element from becoming dislodged from its position in the respective apertures 44 and 62, a pair of flange portions 68 and 70 are provided near the respective ends 64 and 66 of pin element 42. The flange portions 68 and 70 which are larger in diameter than the width of portion 60 of slot 44 or aperture 62 and only slightly smaller than portion 56 of slot 44, aid the pin element 42 from being forced through either of the aforementioned apertures through wall 13 or 15, respectively. It will be noted that in the drawing aperture 62 in wall 15 has a slightly larger diameter on the inside 72 of wall 15 than on the outside 74 of wall 15. This is provided to make it easier to move end 64 of pin element 42 upward and downward. However, the operation of the pin element 42 according to the invention will not be hindered if the aperture 62 in wall 15 is of equal diameter on both the inside 72 and the outside 74 thereof. The only requirement in the latter case is that the aperture 62 be sufficiently large that end 66 of pin element 42 has ample room to pivot freely therein. The upper portion 56 of slot 44 in wall 13 of body member 12, as was mentioned above and which can be seen in FIG. 4 of the drawings, is slightly larger in diameter than the flange portions 68 and 70 of pin element 42. This has been provided so that the pin element 42 may be easily positioned in apertures 62 and 44 of the respective walls 13 and 15. To position the rod-like pin element, the end 66 is first fed through portion 56 of aperture 44. This is followed by flange portion 70, center section 76 and flange portion 68 of pin element 42. As the pin element is being fed into portion 56 of aperture 44, it is angled downward toward aperture 62 where the end 66 will be received. At this time the end 66 will be aligned with aperture 62 and fed therethrough. Once flange portion 68 passes through portion 56 of aperture 44, the pin element is in place. The normal tension of pawl spring 46 against the center section 76 behind flange portion 68 of the pin element prevents the pin element from becoming removed from its position in the respective apertures when the pin element is in its upward position, as shown in solid lines in FIG. 4, and when the pin element is in its lower position the end portion 60 of aperture 44 is smaller in width than the diameter of flange portion 68 and thus the pin element cannot be removed therethrough.

Looking now at FIG. 5 of the drawings, the direction setting pin element 42 can be seen in position with flange portions 68 and 70 adjacent respective walls 13 and 15. It will be noted that walls 13 and 15 are made into a U-shape so that aperture 38 provided thereby can slidably engage rail portion 36 of support member 32. The socket handle 14 is shown extending from the right end of the assembly, as shown in the figure.

FIG. 6 of the drawings shows a sectioned view looking directly at wall 13 through slot 44 thereof into aperture 62 in wall 15 of body member 12. This is the view of the aperture which one has upon the insertion of pin element 42 into position therein. As can be seen portion 56 of aperture 44, which is preferably circular in shape, has a larger diameter than the aperture 62 of wall 15.

For purposes of affording a more complete understanding of the invention, it is advantageous now to provide a functional description of the mode in which the component parts thus far described cooperate.

As was explained above, the movement of body member 12 along support member 32 is determined by the positioning of the two pawl members 20 and 22. The positioning thereof is controlled by the placement of the rod-like direction setting pin element 42 which in turn causes spring 46 to compress or relax, thus forcing pawl 22 to positively engage or disengage teeth 34 of support 32. When pawl spring 46 is compressed, it provides positive engagement of pawl 22 in one of the teeth, such as 80, as shown in FIG. 2 of the drawings. When the pin element 42 is in an upward position, downward movement of the jack handle which is inserted in aperture 17 of handle socket 14, will cause the body member 12 to move upward on the support member 32. As the slope on the underside 82 of the teeth 34 is at a lesser angle to the vertical than the upper side 84 of the teeth, pawl 20 will climb over the crest of the tooth when the jack handle is operated in a downward position until the pawl 20 engages the upper portion of the tooth where it will be held firmly thereby. When in this position, the upper pawl 20 will support the load as the jack handle is moved upward. As the jack handle is moved upward, pawl 22 being forced toward teeth 34 engages the upper slope of the next upward tooth and the lifting operation is repeated. When the body member is to be lowered, the compression of pawl spring 46 is alleviated by moving the pin element 42 to its downward position, as shown in FIG. 3 of the drawings. Pawl 22 is thereby freed from positive engagement with the teeth, whereas pawl 20 remains in engagement therewith. As the jack handle is depressed it will rotate about the axis of rod 16, lowering pawl 22 into engagement with the upper slope of the next lower tooth. Upon contact of pawl 22 with the next lower tooth, the vertical load will be transmitted thereto and the vertical load on pawl 20 will be relieved. At this point, pawl spring 46 exerts on pawl 20 a force away from support member 32 causing the pawl 20 to disengage the tooth completely. As the jack handle is lifted into an upper position, the axis of rotation becomes that of rod 18 and pawl 20 drops into engagement with the upper slope of the next lower tooth. The prior described sequence of lowering and raising the jack handle will effectively lower the body member 12 along the support member 32.

The rod-like pin element 42 according to the invention, which must be moved to an upward position to operate the jack assembly in a lifting sense and positioned in the lower end of slot 44 to operate the jack in a lowering sense, is easily movable within slot 44 because the resistance to movement caused by contact with pawl spring 46 is very small due to the rounded surfaces of both the pawl spring and the pin element. As mentioned above, in the prior art arrangement which comprises a riveted lever assembly as a direction setting device, a greater effort is required to position the lever in an upward or downward position, because it is riveted to the wall of the body member. The frictional contact between the riveted lever and the wall is greater than is the frictional contact between the spring member and the pin element. Also, in using a pin element instead of the lever assembly described above, the pin element when in a lower position, as shown in FIG. 3 of the drawings, makes contact with spring 46, and prevents pawl member 22 from falling too far out of position when the body member 12 is being lowered. The prior art lever assembly does not provide this function and therefore requires in addition a tab member which acts as a stop to prevent the lower pawl member from being moved entirely out of position.

Thus, the rod-like pin element according to the invention provides a simple, efficient, inexpensive, easily assembled direction setting device which overcomes the disadvantages of the lever mechanism frequently used in presently manufactured automobile jack assemblies.

It will be obvious to those skilled in the art that changes and modifications may be made without departing from the invention in its broadest aspects, and therefore the aim in the appended claims is to cover all such changes and modifications as come within the true spirit and scope of the invention.

The invention is claimed as follows:

1. A direction setting mechanism for use in a jack assembly comprising a support member, a body member mounted for movement along said support member and including pawl means therein, and a pawl spring attached to said pawl means for urging said pawl means into a first relation with said support member for moving said body member in one direction along said support member and into a second relation with said support member for moving said body member in the other direction along said support member; said direction setting mechanism comprising a rod-like pin element extending transversely of said body member and pivotally secured at one end thereof within and at one side of said body member with the other end thereof extending laterally outwardly of an opposite side of the body member and being laterally movable with respect to said body member to a first and second position, respectively, an intermediate portion of said pin element contacting said pawl spring so that upon the moving of said pin element to said first position, said pin element thereby compresses said pawl spring causing said pawl means to be urged into said first relation with said support member, and upon moving said pin element to said second position, said pin member thereby relaxes said pawl spring, causing said pawl means to be urged into said second relation with said support member.

2. A direction setting mechanism as claimed in claim 1 wherein said body member includes a pair of spaced walls each having an aperture therethrough, a first one of said apertures being elongated in shape and being substantially aligned with a second aperture in the other wall, and wherein said rod-like pin element includes a pair of flange portions each being located a predetermined distance from a respective end of said pin, each end of said pin element being received in a respective one of said apertures with said flange portions adjacent a corresponding wall in the space therebetween, the end of said pin element received in said elongated aperture extending outwardly therefrom, a portion of said pin element between said flange portions being in contacting relation with said pawl spring so that upon moving the outwardly extending end of said pin element to a first end of said elongated aperture, said spring is compressed by said pin element, and upon moving said end of said pin element to the other, second end of said elongated aperture, said pawl spring becomes relaxed.

3. A direction setting mechanism as claimed in claim 2 wherein said second one of said apertures is of sufficient size to allow for the pivotal movement therein of the end of said pin element received thereby.

4. A direction setting mechanism as claimed in claim 3 wherein said pin element is circular in shape with a diameter of a predetermined size and said flange portions are circular in shape with a diameter large than that of said pin element and wherein the outside distance between said flange portions is substantially equal to the inside distance between the walls of said body member.

5. A direction setting mechanism as claimed in claim 4 wherein said first elongated aperture is key-hole shaped with the diameter of the circular shaped upper portion thereof being slightly larger than the diameter of said flange portions, and wherein the lower elongated portion of said key-hole shaped aperture is slightly larger than the diameter of said circular shaped pin element.

6. A direction setting mechanism as claimed in claim 5 wherein said circular portion of said key-hole shaped aperture comprises said first end of said aperture to which said pin element is moved, and wherein upon moving said pin element to said circular shaped portion of said key-hole shaped aperture, the tension of said spring under compression causes said pin element to be forced against the perimeter of said circular shaped portion and is thus prevented from moving vertically downward therefrom.

7. An automobile jack assembly comprising: a body member including a pair of spaced parallel wall members, a first one of said wall members having therethrough an aperture with an upper end portion and an elongated lower end portion, the width of said lower end portion being smaller than that of said upper end portion, and the second one of said wall members also having an aperture therethrough, said apertures in said respective wall members being in substantial alignment with each other; jack handle means pivotally mounted on and between said wall members; pawl means pivotally mounted on said jack handle means; a vertical support member having along one edge thereof a set of teeth, said body member being mounted on said support member with the wall members of the body member being positioned on either side of the latter, for movement therealong with said pawl means engaging the teeth thereof; a pawl spring mounted on said pawl means between the wall members of said body member in close relation to said apertures in said wall members; and a direction seting rod-like pin element positioned in said aligned apertures in the walls of said body member and extending therebetween, a first end of said pin element being received in said aperture in said second one of said wall members and the second end of said pin element being received and extending outwardly from the aperture in said first one of said wall members, so that upon moving said first end of said pin element into the upper end portion of said aperture in said first wall member, said pin element engages said spring so as to compress the latter thereby to cause the positive engagement of said pawl means with said teeth along the edge of said support member, so that said body member is raised upon the operation of said jack handle means, and upon moving said first end of said pin element into the lower end portion of said aperture in said first wall member, said spring member becomes relaxed so as to release said pawl means from positive engagement with the teeth of said support member, whereby said body member is lowered upon the operation of said jack handle means.

8. An automobile jack assembly as claimed in claim 7 wherein said pawl means includes a pair of pawl members, both of which are separately, pivotally mounted on said jack handle means, one pawl member being a raising member and the other pawl member being a lowering member, wherein said pawl spring is attached at one end thereof to a first one of said pawl members and at the other end thereof to the other one of said pawl members and wherein, upon the moving of said pin member to said upper end portion of said aperture in said first wall member, said pin member compresses said pawl spring, causing the positive engagement of said lifting pawl member with said teeth.

9. An automobile jack assembly as claimed in claim 7, wherein said direction setting pin element includes a pair of flange portions located along the lentgh of said pin, each being a predetermined distance from a respective end of said pin element, and wherein said flange portions are located adjacent the inside of a respective one of said wall members thereby to prevent the dislodging of said pin from said apertures.

10. An automobile jack assembly as claimed in claim 9, wherein said elongated aperture is in the shape of a key-hole and said pin member has a circular cross-section and wherein said flange portions are slightly smaller in diameter than the circular portion of said key-hole aperture so that said pin member may be positioned between said wall members therethrough.

References Cited

UNITED STATES PATENTS

| | | | |
|---|---|---|---|
| 2,176,715 | 10/1939 | Johnson | 254—111 |
| 2,249,050 | 7/1941 | Schmidt | 254—111 |
| 2,730,903 | 1/1956 | Trautman et al. | 74—141.5 |

ROBERT C. RIORDON, Primary Examiner